United States Patent [19]

Koshida et al.

[11] 4,267,199
[45] May 12, 1981

[54] NOODLE SOUP MIX

[75] Inventors: Daikichi Koshida, Toyonaka; Ko Sugisawa; Yasushi Matsumura, both of Nara; Kazumitsu Taga, Neyagawa, all of Japan

[73] Assignee: House Food Industrial Company Limited, Osaka, Japan

[21] Appl. No.: 63,599

[22] Filed: Aug. 6, 1979

[30] Foreign Application Priority Data

Aug. 7, 1978 [JP] Japan ............................ 53-108623[U]

[51] Int. Cl.³ ............................ A23L 1/40; A23L 1/16
[52] U.S. Cl. .................................... 426/589; 426/120; 426/124; 426/557
[58] Field of Search ................ 426/589, 120, 124, 557

[56] References Cited

U.S. PATENT DOCUMENTS

| 2,079,649 | 5/1937 | Allen | 426/589 |
| 2,270,582 | 1/1942 | Esselen | 426/589 |
| 2,366,366 | 1/1945 | Souder | 426/589 |
| 2,426,634 | 9/1947 | Melnick | 426/589 |
| 2,468,744 | 5/1949 | Galvin | 426/589 |
| 3,563,768 | 2/1971 | Melnick | 426/589 |

Primary Examiner—Jeanette M. Hunter
Attorney, Agent, or Firm—Toren, McGeady and Stanger

[57] ABSTRACT

A convenience food composed of dehydrated noodles and two packages of soup, the first soup being capable of maintaining the pH value of the liquid obtained after boiling the noodles with the soup at more than 7, and a second soup having an acidity sufficient to reduce the pH of the liquid to 5.0 to 7.0 by adding said second soup to the liquid obtained from boiling the noodles with the first soup. The convenience food provides excellent texture in the cooked noodles as well as uniform flavoring throughout.

8 Claims, 1 Drawing Figure

U.S. Patent
May 12, 1981
4,267,199
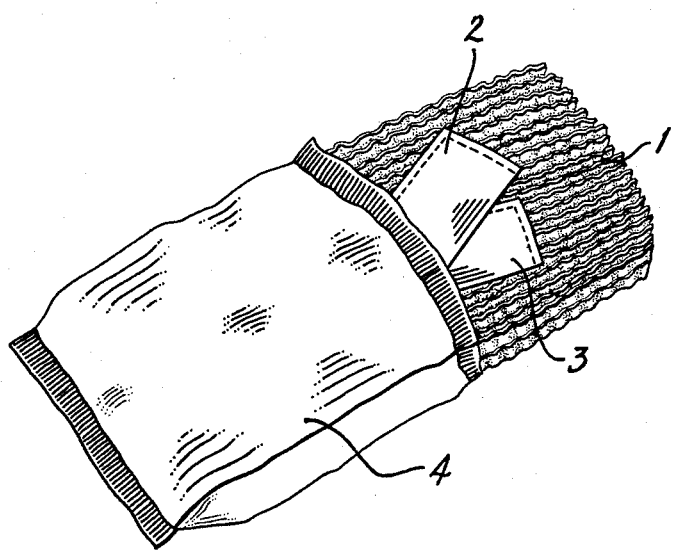

NOODLE SOUP MIX

BACKGROUND OF THE INVENTION

1. Field of the Invention

This invention relates to a convenience food comprising a quantity of dehydrated noodles and two packages containing soups having different properties.

2. Description of the Prior Art

Dehydrated instant cooking noodles which can be reconstituted by merely immersing or boiling in hot water in a short period of time and snack noodles packaged with dehydrated additives which may be restored rapidly by adding hot water or with liquid or pasty additives in a separate package are well known. These convenience foods are marketed widely in Japan and in the United States.

The dehydrated noodles are prepared usually by kneading wheat or buckwheat flour with water and a mixture of alkali metal salts, such as, sodium or potassium carbonates, bicarbonates, phosphates, polyphosphates and the like into a dough which is rolled into a sheet, and the sheet is cut into strips having a typical width of 1 to 2 mm. The strips are usually cut into 30 g to 90 g quantities of noodles and are dried with hot air or packed in a shallow container and fried in hot oil to obtain a lump of dehydrated noodles.

The mixture of alkali metal salts may impart a special texture, palatability and flavor to the reconstituted noodles which are known as Chinese noodles. Such dehydrated noodles are the main component of the convenience food of the present invention.

Conventional dehydrated noodles are reconstituted in hot water in a short period of time, e.g., about 2 to 5 minutes. The additives, which are packed in a separate container consisting of powdered or pasty soup, flavoring agent, aromatics and the like, are added to the reconstituted noodles and served. If the additives are mixed in after the reconstitution of the noodles, the taste imparting ingredients in the additives do not penetrate adequately into the individual noodle. As a result, the reconstituted noodles do not match with the soup even if the concentration of the soup is increased.

If, however, the dehydrated noodles are boiled with water and the additives and taste imparting ingredients may penetrate into the noodles, the aromatic substance of the spices or essence in the additives may evaporate during boiling. Also, the alkali substance in the noodles is neutralized by the organic acids in the soup or the acidic substances in the soy sauce contained in the additives. As a result, the special palatability and flavor of the reconstituted noodles affected by the presence of alkali metal salts will be substantially lost.

Evaporation or decomposition of the aromatic flavoring substances and neutralization of the reconstituted noodles are caused by boiling with water and the reconstituted noodles remain unflavored and have a different palatability and texture compared to that of conventional Chinese noodles. The components of the conventional convenience food consisting of a quantity of dehydrated noodles and a separate package containing taste imparting and aromatic flavorings cannot be cooked by placing these components simultaneously in boiling water for these reasons.

BRIEF DESCRIPTION OF THE DRAWING

The drawing is a perspective view of a package of the convenience food in accordance with the present invention.

SUMMARY OF THE INVENTION

We have discovered that a more appealing mutlicomponent convenience food, the components of which can be cooked in boiling water, is obtained by dividing the seasonings for the noodles in two packages, one of which contains a heat resistant taste imparting soup and the other of which contains a volatile or heat sensitive soup.

The first soup has an alkalinity or slight acidity sufficient to maintain the pH value of the boiling water at more than 7 after the dehydrated noodles are cooked with the first soup in boiling water. The second soup has an acidity sufficient to reduce the pH value of the liquid to 5.0 to 7.0 by adding said second soup to the liquid obtained from boiling the dehydrated noodles with the first soup.

DESCRIPTION OF THE PREFERRED EMBODIMENTS

More particularly, the first soup preferably consists mainly of seasonings of chemical compounds, such as, sodium chloride, monosodium glutamate, sodium 5'-inosinate and sodium 5'-guanylate and natural seasonings, such as, meat extract and extracts from vegetals. They are resistant to boiling with water and do not evaporate nor decompose in water when the dehydrated noodles are cooked with the first soup in boiling water.

The pH value of the first soup is about 5 to 8. When the dehydrated noodles are extracted merely with hot water, the pH value of the extracted liquid is usually 7 to 9.5. It is necessary to maintain the pH value of the boiled liquid at more than 7 when the dehydrated noodles are cooked with the first soup in boiling water. If the pH value of the boiled liquid decreases below 7, the alkalinic substance in the noodles is neutralized in the boiling water and the special palatability and flavor of the reconstituted noodles are substantially lost. The present inventors have found that the special palatability and flavor of the Chinese noodles can be maintained by keeping the pH value of the boiled liquid at more than 7.

The second soup consists mainly of the flavoring agent, such as, spices, aromatics and other seasonings. The spices include pepper, garlic, ginger and the like, and the aromatics include synthetic aroma and aromatic substances extracted from the spices. The other seasonings include the fermentation products containing the special aroma, such as, soy sauce and soy paste, which are produced by the fermentation of soy beans with microorganisms.

The second soup has usually a pH value of about 4 to 6.9 and also usually contains organic acids, such as, acetic acid, citric acid, malic acid and succinic acid and the like which are useful for flavoring the reconstituted noodles and are present in soy sauce. The essential flavoring substance contained in the second soup is volatile or is readily decomposed in boiling water. The acidity and the amount of the second soup are adjusted to reduce the pH value of the liquid after boiling the dehydrated noodles with the first soup to 5.0 to 7.0.

The convenience food of the present invention consists of a quantity of dehydrated noodles and two packages of soup having different properties. The dehydrated noodles for one serving with two packages of soup are usually packaged in an envelope of thin plastic film as illustrated in the drawing. It is a perspective view of the convenience food of the invention when a part of the dehydrated noodles are drawn out from the envelope. 1 are the dehydrated noodles, 2 and 3 are the small packages of soup and 4 is the envelope. The noodles in the envelope are sold in the market and the composite noodles have a prolonged storage life since the noodles are dehydrated and the soup is packaged in two separate packages.

The soup used in the invention may be in the form of a liquid, powder, or paste and the form and material of the packages can be selected as desired.

The consumer can readily take out the dehydrated noodles from the envelope, the first soup and hot water are added to the noodles in a pan and the mixture is cooked in boiling water for 1 to 10 minutes. It is desirable to prolong the contact time of the noodles with the first soup in boiling water to achieve adequate penetration of the taste imparting ingredients into the individual noodles. The dehydrated noodles are reconstituted uniformly and the pH value of the boiling liquid is maintained at more than 7 in order to keep the special palatability and flavor of the Chinese noodles.

After boiling the noodles with the first soup, heating of the mixture is stopped and thereafter, the second soup is added to the mixture. The pH value of the mixture is decreased to 5.0 to 7.0.

It is preferable to avoid heating after adding the second soup to the mixture since the second soup contains the volatile aroma or heat sensitive flavoring substances necessary for the reconstituted noodles. Although the pH value of the liquid in the mixture after adding the second soup is reduced to 5.0 to 7.0, the special palatability and flavor of the noodles are not lost, since the heating is stopped and the flavoring substances in the Chinese noodles are not decomposed.

Conventional additives, such as, dried stone-leek, carrots, mushrooms and Chinese bamboo or animal and vegetable oils, can be added to the noodles or the soup, or can be packaged in another package.

The convenience food of the present invention thus provides the composite noodles capable of being reconstituted readily by the consumer. The dehydrated noodles are cooked with the first soup in boiling water in a short period of time and thereafter, the second soup may be added not only in the kitchen but also outdoors. The taste imparting substance in the first soup penetrates more completely than the usual additives by cooking in boiling water without decomposing the special flavor of the noodles. The volatile and acidic flavoring substance in the second soup imparts the essential flavor to the reconstituted noodles. The convenience food of the invention can provide well seasoned reconstituted noodles which possess both good texture and flavor by a simple manner of cooking without wasting the flavoring substances.

What is claimed is:

1. A convenience food comprising:
   (a) dehydrated noodles,
   (b) a first soup adapted to maintain the pH value of the liquid obtained after boiling said noodles with said first soup at more than 7, and
   (c) a second soup having an acidity sufficient to reduce the pH value of the liquid to 5.0 to 7.0 by adding said second soup to the liquid obtained from boiling the dehydrated noodles with the first soup.

2. The convenience food of claim 1 wherein the dehydrated noodles are prepared by kneading wheat or buckwheat flour with water and a mixture of alkali metal carbonates, bicarbonates, phosphates or polyphosphates to make a dough, rolling said dough into a sheet, cutting said sheet into strips and drying said strips.

3. The convenience food of claim 1 wherein said first soup contains a taste imparting ingredient resistant to boiling with water.

4. The convenience food of claim 3 wherein said taste imparting ingredient is a member selected from the group consisting of table salt, monosodiumglutamate, meat extract, and extract from vegetals.

5. The convenience food of claim 1 wherein said second soup contains a flavoring ingredient which readily evaporates or is decomposed by boiling with water.

6. The convenience food of claim 5 wherein said flavoring ingredient includes spices selected from the group consisting of pepper, garlic, ginger, aromatics, essences, soy sauce and soy paste.

7. The convenience food of claim 1 wherein said first and second soups are in the form of a liquid, powder, or paste.

8. A method of preparing a convenience food comprising:
   (a) boiling dehydrated noodles in water with a first soup for a period from 1 to 10 minutes, which soup is adapted to maintain the pH value of the liquid obtained from the boiling at more than 7;
   ceasing the heating of the mixture and thereafter adding a second soup capable of decreasing the pH of the mixture to the range of 5.0 to 7.0;
wherein said first soup contains taste imparting substances which completely penetrate the noodles at boiling temperatures and said second soup contains volatile and acidic substances for imparting the essential flavor to the reconstituted noodles.

* * * * *